(12) United States Patent
Green

(10) Patent No.: US 6,175,350 B1
(45) Date of Patent: Jan. 16, 2001

(54) DRIVE CIRCUIT FOR FERROELECTRIC LIQUID CRYSTAL SHUTTER

(75) Inventor: Ian Macdonald Green, London (GB)

(73) Assignee: Central Research Laboratories Limited, Middlesex (GB)

(*) Notice: Under 35 U.S.C. 154(b), the term of this patent shall be extended for 0 days.

(21) Appl. No.: 08/894,635

(22) PCT Filed: Feb. 23, 1996

(86) PCT No.: PCT/GB96/00417

§ 371 Date: Aug. 25, 1997

§ 102(e) Date: Aug. 25, 1997

(87) PCT Pub. No.: WO96/27182

PCT Pub. Date: Sep. 6, 1996

(30) Foreign Application Priority Data

Feb. 25, 1995 (GB) .................................... 9503858

(51) Int. Cl.[7] ............................................. G09G 3/36
(52) U.S. Cl. ............................ 345/96; 345/98; 345/97; 345/209
(58) Field of Search ................................ 345/98, 97, 96, 345/87, 209, 82

(56) References Cited

U.S. PATENT DOCUMENTS

| | | | |
|---|---|---|---|
| 4,065,916 | * | 1/1978 | Leuschner ............................... 368/70 |
| 4,904,064 | * | 2/1990 | Lagerwall et al. ...................... 349/37 |
| 5,227,900 | * | 7/1993 | Inaba et al. ............................. 345/97 |
| 5,233,446 | * | 8/1993 | Inoue et al. ............................. 345/87 |
| 5,345,146 | * | 9/1994 | Koenck et al. ..................... 315/169.3 |
| 5,379,051 | * | 1/1995 | Suga et al. ............................. 345/97 |
| 5,900,849 | * | 5/1999 | Gallery ..................................... 345/8 |

FOREIGN PATENT DOCUMENTS

| | | |
|---|---|---|
| 2208741 | 4/1989 | (GB) . |
| 2262830 | 6/1993 | (GB) . |

* cited by examiner

*Primary Examiner*—Steven J. Saras
*Assistant Examiner*—Fritz Alphonse
(74) *Attorney, Agent, or Firm*—Evenson, McKeown, Edwards & Lenahan, P.L.L.C.

(57) ABSTRACT

In order to overcome problems with residual d.c. offset, and input signals with arbitrary timing, a drive circuit for a ferroelectric liquid crystal device includes a counter arranged for counting between first and second predetermined values in response to an input signal. The counter is designed so as to count in a first direction in response to a positive edge of the input signal and in a second direction in response to a negative edge of the input signal. Gating and latching circuits are responsive to the counting of the counter and the direction of count so as to provide appropriate positive or negative output voltage pulses for driving a ferroelectric liquid crystal device. An output stage comprising a bridge circuit is coupled via a step up transformer to the display device.

10 Claims, 2 Drawing Sheets

DRIVE CIRCUIT FOR FERROELECTRIC LIQUID CRYSTAL SHUTTER

This invention relates to a circuit for driving a ferroelectric liquid crystal device, preferably a shutter.

Such shutters have a bistable characteristic, being either open or closed, and are switched from one state to the other by an applied voltage pulse, whose polarity determines the final state of the shutter. A typical voltage pulse might be 40 volts in amplitude, and 10 microseconds in duration. At low ambient temperatures, a longer pulse may be beneficial.

It is known that, to maximise the shutter life, the applied voltage should have zero d.c. component. Even a small fraction of a volt can be detrimental. A known difficulty lies in devising a drive circuit without any d.c. component. For instance, any circuit using a series coupling capacitor is likely to have problems with the initial capacitor charging current. GB-A-2208741 and GB-A-2262830 have addressed this problem.

A second known difficulty lies in opening and closing the shutter under control of an arbitrary waveform; if the opening and closing pulses come sufficiently close in time as to overlap, and the driving waveform is not a square wave with a mark/space ratio of 1:1, logic gating circuitry will truncate one polarity of pulse more than the other, resulting in a d.c. component at the output. Known drive circuits for ferroelectric liquid crystals have included bulky arrangements of driver transistors operating on high voltage supplies. The timing of input control signals to the drive circuit has to be carefully controlled, since closely spaced input drive signals may create the above problems in the output drive waveform.

The object of the invention is to provide a driving circuit whose output is substantially free from d.c. offset, and which makes it simple to control a shutter from an input control signal with arbitrary timing.

The present invention provides in one aspect, a drive circuit for a ferroelectric liquid crystal device, the circuit including a count means arranged for counting between first and second predetermined values in response to an input signal, and being such as to count in a first direction in response to a first parameter of the input signal and in a second direction in response to a second parameter of the input signal, and output means responsive to the counting of the counter means and the direction of count such as to provide appropriate positive or negative output voltage pulses for driving a ferroelectric liquid crystal device.

Thus in a preferred embodiment, the circuit includes a counter with end stops for maximum and minimum counts. The counter, which is clocked by a reference frequency, counts up when the device (shutter) is to be switched to one state, and down when it is to be switched to the other state. While it is counting up, the output voltage pulse is of one polarity; when counting down, of the other polarity. When the counter reaches either of the end stops, the shutter drive voltage returns to zero.

The invention ensures that the d.c. component across the shutter is zero under all conditions, independent of the timing of the waveform of the input signal, since over a long period the number of up counts must equal the number of down counts.

A preferred form of count means comprises an up-down counter driven by a clock signal, for example a 5 MHz oscillator driving an 8 bit counter, which has control inputs for determining the direction of count. The output of the count means is coupled through logic circuitry for providing output signals indicating that the counter is in a count condition and the direction of count, to output drive circuitry. Other count means may be employed, for example a processor unit or a general purpose micro processor, a circulating shift register, or more than one shift register, having one or more stages containing a bit signal of one type, and the remaining stages with a bit signals of the other type. It would be possible to have a single bi-directional shift register.

In a further form, the count means may include a dual slope capacitive integration arrangement for providing a highly linear voltage slope with time.

As preferred, the output drive circuitry responsive to the output of the count means includes a bridge arrangement of MOSFETs operating at a relatively low voltage with an output drive signal being provided through a step up voltage transformer.

In addition, a biasing drive signal of say 100 Hz may be provided from the clock signal through output drive circuitry and coupled to the liquid crystal shutter through a further transformer arrangement. The advantage of using transformer couplings is that of lack of any d.c. component in the output signal which might tend to degrade the liquid crystal. Although other forms of isolation may be envisaged, the advantage of using a transformer is that the output drive signal can be stepped up in voltage magnitude.

Accordingly, in a second aspect, the present invention provides a electrical drive circuit for a ferroelectric liquid crystal device, including timing means responsive to an input signal for producing drive control pulses to an output circuit, the output circuit producing rectangular output pulses in response to the control pulses and including transformer means for coupling the rectangular drive pulses to the liquid crystal display.

BRIEF DESCRIPTION OF THE DRAWINGS

A preferred embodiment of the invention will now be described with reference to the accompanying drawings wherein.

DESCRIPTION OF THE PREFERRED EMBODIMENT

Figure 1:
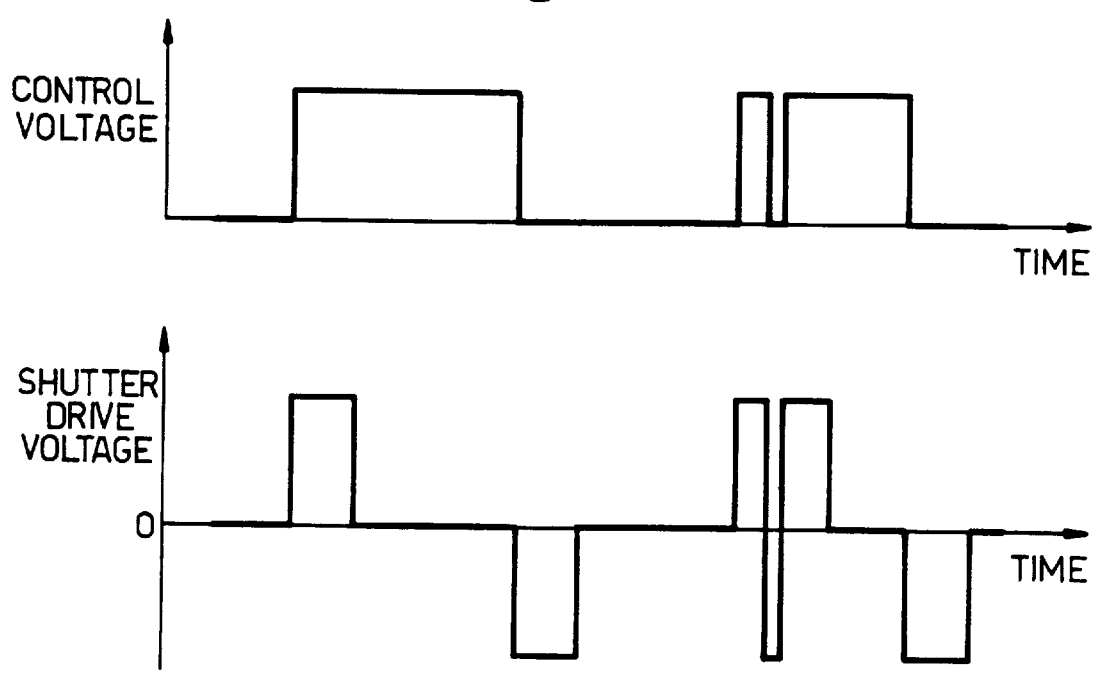
FIG. 1 is an example of an input control waveform and a corresponding display drive voltage which is achieved with the present invention.

FIG. 1 shows an example of an input control voltage waveform, and the corresponding output drive voltage for a ferroelectric liquid crystal shutter. The control input has two states, positive or zero, corresponding to the shutter being open or closed. The output shutter drive voltage has a rectangular waveform, a positive pulse being produced in response to a positive going edge of the control voltage, and a negative pulse being produced in response to a negative going edge of the waveform. Both pulses are of equal and fixed duration, determined by a counter which is clocked between its maximum and minimum counts. This situation is shown at the left hand side of FIG. 1.

When the control input edges are closer together, as shown towards the right hand side of FIG. 1, the output pulses overlap, but always in such as way as to give a waveform with no average d.c. component.

Figure 2:
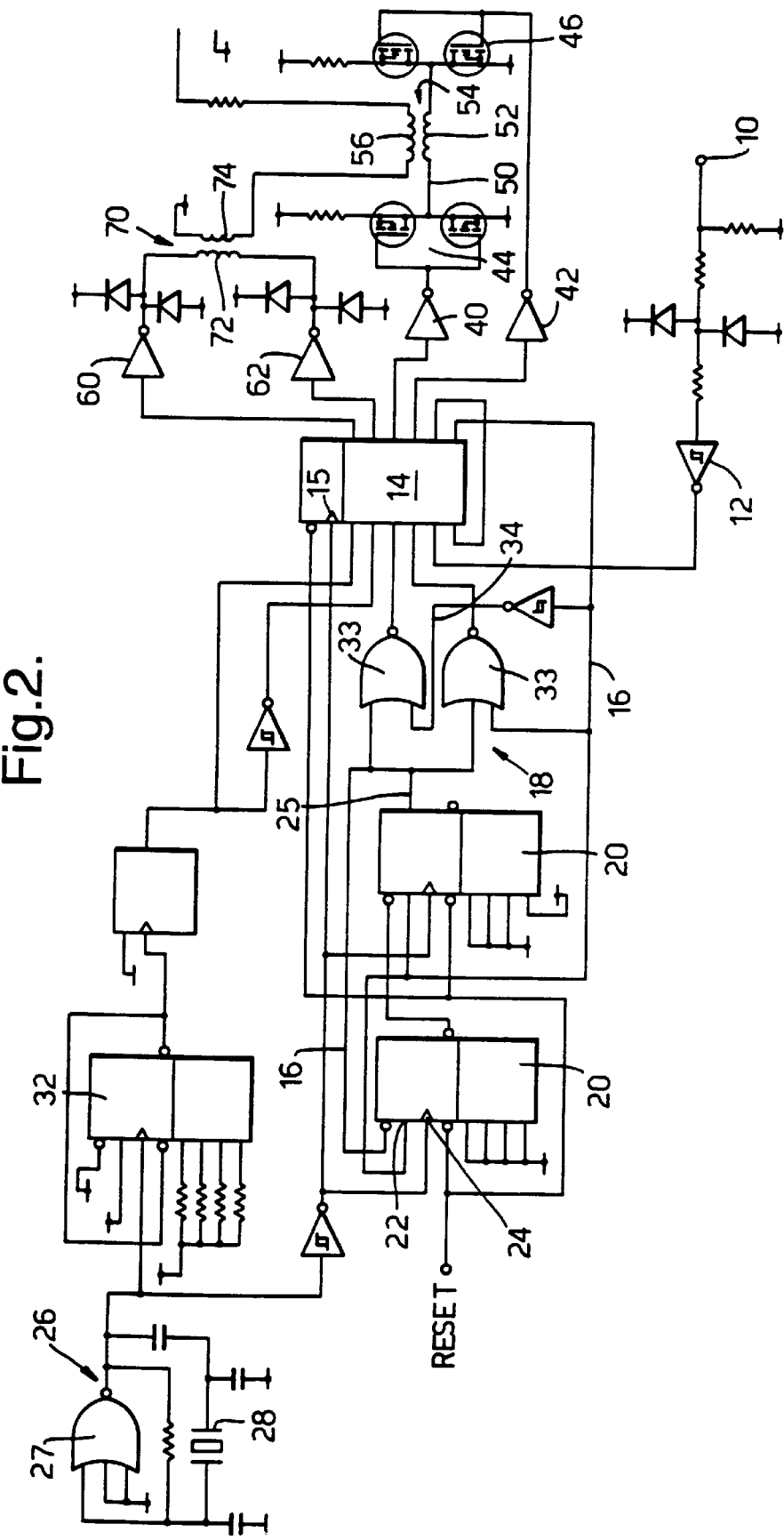
FIG. 2 is a circuit diagram of a preferred implementation of the invention.

Referring to FIG. 2, an input port 10 receives a digital input signal and is applied through a conditioning circuit which includes a Schmitt trigger 12 to a latching circuit 14. Latching circuit 14 receives a clock signal at an input 15, and the conditioned input signal is circulated through latch 14 twice, in order to synchronise the signal by means of the clock signal with the remainder of the circuit. The retimed and conditioned input signal provides up/down control signals on line 16 to gating circuitry 18 and an up/down counter 20.

Up/down counter 20 is configured as two 4 bit counters and receives, at a control input 22, an input signal on line 16 and receives at clock input 24 a clock signal from a 5 MHz clock 26. Clock 26 comprises a NOR gate 27 and a crystal oscillator 28 connected in a feed back arrangement; the output of clock 26 is coupled to counter 20 via a Schmitt trigger 30. The output of clock 26 is also applied through a divide by 50 circuit 32 to provide a 100 KHz biasing signal which is applied to latching circuitry 14.

Gate circuit 18 comprises two NAND circuits 33 receiving as inputs the output 25 of the counter 20, the input signal on line 16 and an inverted version thereof on line 34. The outputs of the gating circuit 18 are applied through latching circuit 14 to inverting amplifiers 40, 42 which provide voltage amplification (5V to 12V) at a relatively low WO 96127182 PCT/GB96/00417 output impedance. Amplifiers 40, 42 drive complementary pairs of MOSFET transistors arranged in two pairs 44, 46 in a bridge configuration 50. Transistor pairs 44, 46 provide low impedance current amplification to a primary winding 52 of a transformer 54 (having a step up ratio of 140:44), which is connected across the output of the bridge, the secondary winding 56 of the transformer being coupled directly to the ferroelectric liquid crystal shutter (not shown).

The 100 KHz biasing signal provided from divide circuit 32 is applied through latching circuit 14 to drive amplifiers 60, 62 which are coupled through a further transformer 70 (with a ratio of 13:20) having a primary winding 72 and a secondary winding 74 connected in series with secondary winding 56 in order to provide a signal 5 volts in magnitude to the shutter. The ability to use a transformer in this configuration relies on there being zero d.c. component in the driving waveform; otherwise the direct primary current would cause the transformer to saturate.

Thus in operation, a digital input received at line 10 is squared in the Schmitt trigger 12, retimed in latching circuit 14 and its edge, positive- or negative-going is employed to control the direction of count of counter 20 at input 22. Counter 20 counts between its maximum and minimum counts and for the situation shown at the left of FIG. 1, will count for its full value and then give an appropriate output signal at output port 25 to NAND gates 33. These gates are held in conditions determined by the input signal in latching circuit 14 to provide appropriate control pulses through latching circuit 14 to inverting amplifiers 40, 42, for driving bridge circuit 44, 46. Thus the control pulse is amplified in amplifiers 40 and 42 and current amplification is provided by transistors pairs 44, 46. Finally, the rectangular pulse is stepped up through transformer 54 to provide an appropriate voltage pulse, positive or negative, directly to the shutter.

While this occurs, a constant biasing 5 volt signal of 100 KHz is applied via latching circuit 14, inverting amplifiers 60, 62 and a transformer 70, for conditioning the ferroelectric liquid crystal display.

In the event of the situation showing on the right hand side of FIG. 1 wherein the input signal changes rapidly with time, more rapidly than the duration of the output pulse, the control signal applied to the input 22 of counter 20 will change correspondingly rapidly, so that the counter will count up and then down and then up again, without necessarily reaching its maximum or minimum limits. Since the signals applied to gating circuit 18 represent instantaneously the direction of count, appropriate positive or negative control pulses will be applied through latching circuit 14 to bridge circuit 50. Thus the output will comprise positive and negative pulses having durations less than the maximum duration of the output pulses for input signals of higher frequency.

What is claimed is:

1. A drive circuit for a ferroelectric shutter, in which a control voltage having a first value is input when said shutter is to be kept in a substantially transparent state, and a control voltage having a second different value is input when said shutter is to be kept in a substantially opaque state, said drive circuit being provided with a pulse generator providing shutter drive voltage pulses, said pulse generator being operable to maintain charge balance if said control voltage changes part-way through a shutter drive voltage pulse, wherein said pulse generator includes a counter adapted and arranged to provide a shutter drive voltage pulse having a first polarity during the time taken for said counter to count between two predetermined points in either an upwards or downwards direction when said control voltage changes from said first value to said second value, and to provide a shutter drive voltage pulse having the opposite polarity during the time taken for said counter to count in the opposite direction from the position in the count reached when said control voltage changes from said second value to said first value, thereby maintaining charge balance if said control voltage changes part-way through a shutter drive voltage pulse.

2. A drive circuit according to claim 1 wherein the output of the counter is provided to a gating circuit, together with the input signal and an inverted version thereof, for providing an output representing a counting condition and a direction of count.

3. A drive circuit according to claim 1 and further comprising a clock circuit providing clock signals to the counter and a latching circuit which receives the input drive signal and the clock signal in order to re-time and synchronise the input signal with the clock signal.

4. A drive circuit according to claim 3, wherein the output of the gating circuits are applied through the latching circuit to an output stage.

5. A drive circuit according to claim 1 and further comprising an output stage which provides rectangular output pulses to a liquid crystal display device.

6. A drive circuit according to claim 5, wherein the output stage comprises two pairs of complementary transistors arranged in a bridge configuration.

7. A drive circuit according to claim 5, wherein the output of the output stage is coupled to a primary winding of a first transformer, a secondary winding of the transformer being connected directly to the liquid crystal display device.

8. A drive circuit according to claim 7, wherein the transformer is step up transformer.

9. A drive circuit according to claim 7, and further comprising a device which provides an oscillating bias signal and a further transformer which couples the oscillating biasing signal to the liquid crystal display device.

10. A drive circuit according to claim 9, wherein a secondary winding of the further transformer is connected in series with the secondary winding of the first transformer.

* * * * *